US012697937B1

(12) United States Patent (10) Patent No.: US 12,697,937 B1

Sirapareddy et al. (45) Date of Patent: Aug. 4, 2026

(54) SEATBELT ASSEMBLY

(71) Applicant: GM Global Technology Operations LLC, Detroit, MI (US)

(72) Inventors: Niranjan R. Sirapareddy, Bangalore (IN); Rajamanickam VS, Bangalore (IN); Karthigan Ganesan, Bangalore (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 19/228,011

(22) Filed: Jun. 4, 2025

(51) Int. Cl.
B60R 22/26 (2006.01)
B60R 22/12 (2006.01)

(52) U.S. Cl.
CPC .............. B60R 22/26 (2013.01); B60R 22/12 (2013.01)

(58) Field of Classification Search
CPC ....... B60R 22/26; B60R 22/12; B60R 22/023; B60R 22/00; B60R 2022/1812; D03D 1/0005; D03D 1/00; D03D 25/00; D10B 2401/062; D10B 2401/063; Y10T 442/3033; Y10T 442/3041; Y10T 442/3382; Y10T 442/339
USPC ..... 280/801.1, 807, 808; 297/468, 483, 474; 442/181, 185, 186, 228, 229
See application file for complete search history.

(56) References Cited

U.S. PATENT DOCUMENTS

| | | | | |
|---|---|---|---|---|
| 3,957,283 A | * | 5/1976 | Pocobello | ............... B60R 22/30 |
| | | | | 242/380 |
| 2002/0008376 A1 | * | 1/2002 | Wittenberg | ............. G01L 5/103 |
| | | | | 280/801.1 |
| 2009/0266925 A1 | * | 10/2009 | Browne | ................. D03D 15/67 |
| | | | | 428/222 |
| 2013/0264859 A1 | * | 10/2013 | Fukuzawa | ............... B60R 22/12 |
| | | | | 297/483 |
| 2015/0251626 A1 | * | 9/2015 | Board | ..................... B60R 22/12 |
| | | | | 280/801.1 |
| 2017/0136986 A1 | * | 5/2017 | Beutler | ................... B60R 22/12 |
| 2018/0170296 A1 | * | 6/2018 | Pline | ...................... B60R 21/23 |
| 2022/0024405 A1 | * | 1/2022 | Kaufman | ............... B60R 22/48 |

FOREIGN PATENT DOCUMENTS

| | | | |
|---|---|---|---|
| FR | 2612472 A1 | 9/1988 | |
| WO | WO-2015132344 A1 * | 9/2015 | ............. B60R 21/18 |

OTHER PUBLICATIONS

German Office Action for German Application No. 102025129152.7; dated Feb. 19, 2026; 3 pages.

* cited by examiner

*Primary Examiner* — Keith J Frisby

(74) *Attorney, Agent, or Firm* — CANTOR COLBURN LLP

(57) ABSTRACT

A seatbelt assembly defines a longitudinal direction, a width direction, and a thickness direction, and includes a seatbelt and a reinforcement structure. The seatbelt defines a longitudinal direction, a width direction, and a thickness direction. The seatbelt includes a shoulder belt, a lap belt, and an intermediate belt disposed between the shoulder belt and the lap belt. The reinforcement structure is disposed on the intermediate belt.

18 Claims, 10 Drawing Sheets

SEATBELT ASSEMBLY

The subject disclosure relates to a seatbelt assembly.

Vehicles include seatbelt assemblies to secure an occupant in a vehicle seat. Seatbelt assemblies are designed to reduce the risk of injury to an occupant of a vehicle during a collision. Improvements to seatbelt assemblies is desirable.

SUMMARY

In one exemplary embodiment, a seatbelt assembly comprises a seatbelt defining a longitudinal direction, a width direction, and a thickness direction, and comprising a shoulder belt, a lap belt, and an intermediate belt disposed between the shoulder belt and the lap belt, and a reinforcement structure disposed on the intermediate belt.

In addition to one or more of the features described herein, the reinforcement structure provides additional stiffness to the intermediate belt such that the intermediate belt has greater stiffness along the width direction than the shoulder belt and the lap belt.

In addition to one or more of the features described herein, the reinforcement structure comprises a plurality of reinforcement strips extending along the width direction and spaced apart from each other along the longitudinal direction.

In addition to one or more of the features described herein, the reinforcement strips are formed of metal.

In addition to one or more of the features described herein, the reinforcement strips are formed of steel.

In addition to one or more of the features described herein, the reinforcement strips are formed of plastic.

In addition to one or more of the features described herein, the reinforcement strips extend to both edges of the seatbelt along the width direction.

In addition to one or more of the features described herein, gaps are formed between the reinforcement strips and edges of the seatbelt along the width direction.

In addition to one or more of the features described herein, the reinforcement strips are thicker along the thickness direction than the intermediate belt.

In addition to one or more of the features described herein, the intermediate belt is thicker along the thickness direction than the reinforcement strips.

In addition to one or more of the features described herein, the reinforcement strips are embedded within the intermediate belt.

In another exemplary embodiment, a vehicle comprises a vehicle seat and a seatbelt assembly mounted on or adjacent to the vehicle seat. The seatbelt assembly comprises a latching structure defining a latch loop therein, a seatbelt defining a longitudinal direction, a width direction, and a thickness direction, and comprising a shoulder belt, a lap belt, and an intermediate belt disposed between the shoulder belt and the lap belt and passing through the latch loop, and a reinforcement structure disposed on the intermediate belt.

In addition to one or more of the features described herein, the reinforcement structure comprises a plurality of reinforcement strips extending along the width direction and spaced apart from each other along the longitudinal direction.

In addition to one or more of the features described herein, the intermediate belt has a first dimension along the longitudinal direction, and adjacent reinforcement strips of the reinforcement strips are spaced apart by a second dimension, the first and second dimensions being set such that at least one of the reinforcement strips is always within the latch loop during use.

In addition to one or more of the features described herein, the reinforcement strips extend to both edges of the seatbelt along the width direction.

In addition to one or more of the features described herein, gaps are formed between the reinforcement strips and edges of the seatbelt along the width direction.

In addition to one or more of the features described herein, the reinforcement strips are thicker along the thickness direction than the intermediate belt.

In addition to one or more of the features described herein, the intermediate belt is thicker along the thickness direction than the reinforcement strips.

In addition to one or more of the features described herein, the reinforcement strips are embedded within the intermediate belt.

In yet another exemplary embodiment, a vehicle comprises a vehicle seat and a seatbelt assembly mounted on or adjacent to the vehicle seat. The seatbelt assembly comprises a latching structure defining a latch loop therein, a seatbelt defining a longitudinal direction, a width direction, and a thickness direction, and comprising a shoulder belt, a lap belt, and an intermediate belt disposed between the shoulder belt and the lap belt and passing through the latch loop, and a reinforcement structure disposed on the intermediate belt. The reinforcement structure provides additional stiffness to the intermediate belt such that the intermediate belt has greater stiffness along the width direction than the shoulder belt and the lap belt. The reinforcement structure comprises a plurality of reinforcement strips extending along the width direction and spaced apart from each other along the longitudinal direction. The reinforcement strips are formed of metal or plastic.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
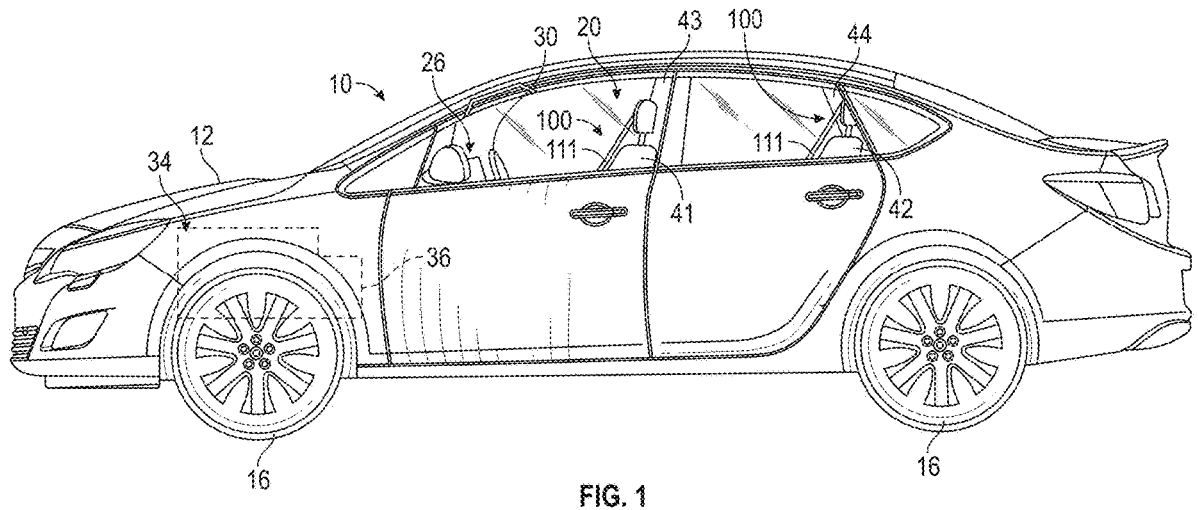
FIG. 1 is a left side view of a vehicle including a seatbelt assembly according to a non-limiting example.

The following description is merely exemplary in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

A vehicle 10 according to a non-limiting example is shown in FIG. 1. The vehicle 10 includes a body 12 supported on a plurality of wheels 16. One or more of the plurality of wheels 16 are steerable. The body 12 may include a B-pillar 43 and a C-pillar 44. The body 12 defines, in part, a passenger compartment 20 having front vehicle seats 41 positioned behind a dashboard 26 and rear vehicle seats 42 behind the front vehicle seats 41. A steering control 30 is arranged between the front vehicle seats 41 and the dashboard 26. The steering control 30 is operated to control orientation of the steerable wheel(s) 16.

The vehicle 10 includes a prime mover 34 connected to a gear assembly and/or transmission 36 that provides power to one or more of the plurality of wheels 16. The prime mover 34 may be an engine, a motor, a hybrid engine and motor system, or other prime movers known in the art. A rechargeable energy storage system (RESS), not shown, may be arranged in the body 12 and may provide power to components within the vehicle 10 (e.g., the prime mover 34).

The vehicle 10 includes a seatbelt assembly 100 according to one or more embodiments. The vehicle 10 may include multiple seatbelt assemblies 100. As shown in FIG. 1, the seatbelt assembly 100 may be positioned at the front vehicle seats 41 (e.g., driver seat and/or front passenger seat)

and/or the rear vehicle seats 42. The seatbelt assembly 100 includes a shoulder belt 111 which, for the driver seat and/or front passenger seat, may be mounted to the B-pillar 43, and for the rear vehicle seats 42, may be mounted to the C-pillar 44 or on the rear vehicle seat 42. The vehicle 10 shown in FIG. 1 is a non-limiting example, and the seatbelt assembly 100 may be disposed in other types of vehicles. As a non-limiting example, the vehicle 10 may be an autonomous vehicle. The vehicle 10 may be a multi utility vehicle and the seatbelt assembly 100 may be positioned at any seat thereof. The vehicle 10 may be a larger vehicle with a D-pillar in which case a portion of the seatbelt assembly 100 may be mounted on the D-pillar.

Figure 2:
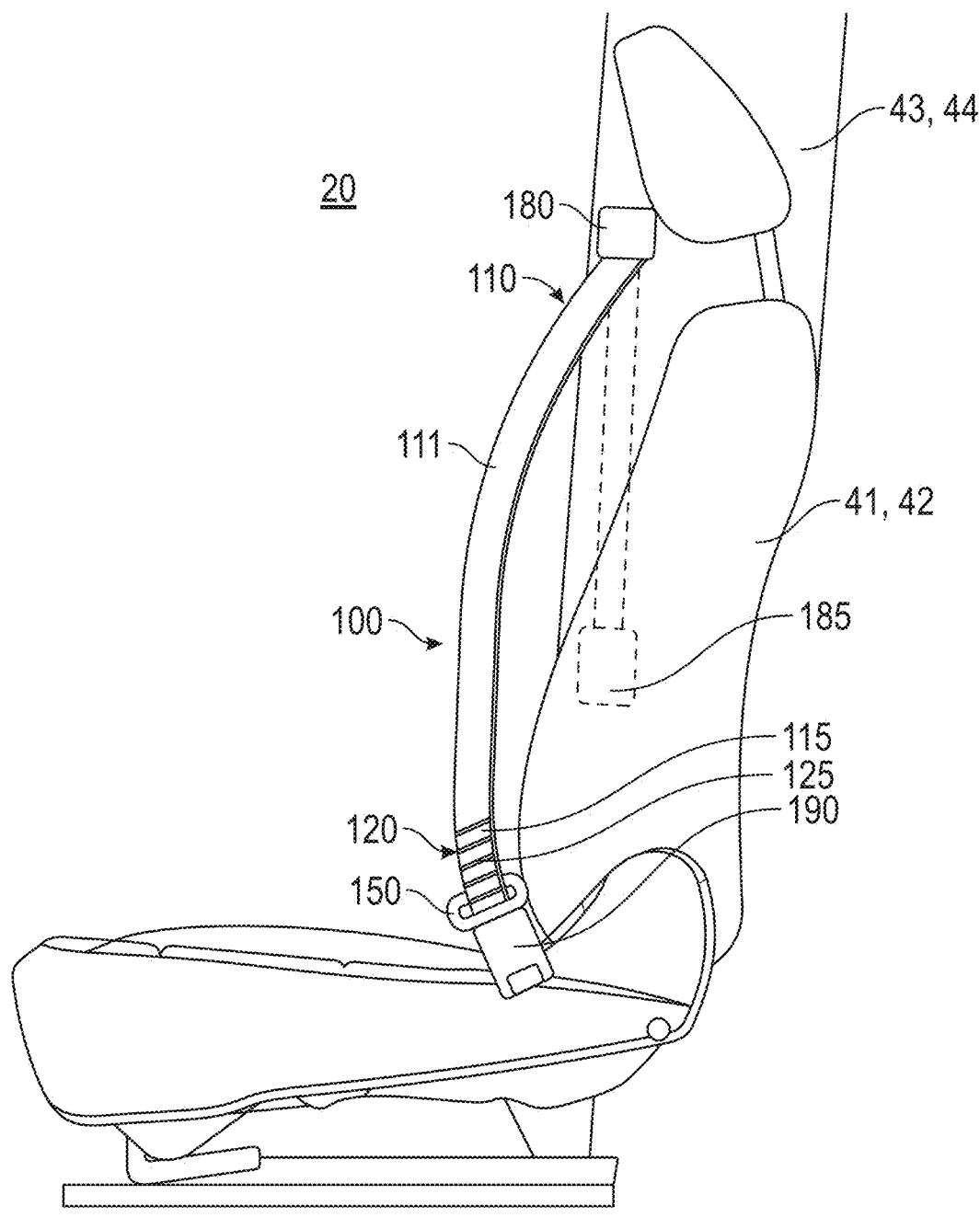
FIG. 2 is a side view of a vehicle seat and a seatbelt assembly according to a non-limiting example.
Figures 3A, 3B:
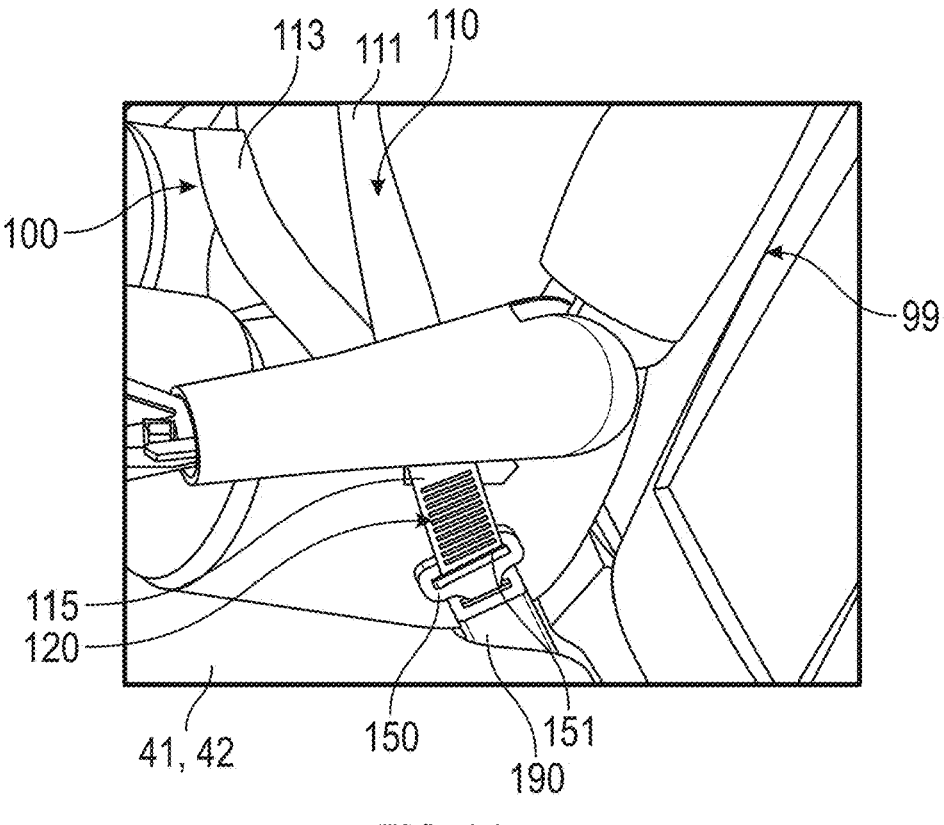
FIG. 3A shows a seatbelt assembly being worn by an occupant according to a non-limiting example.
FIG. 3B shows a closeup of the seatbelt assembly of FIG. 3A.
Figure 6B:
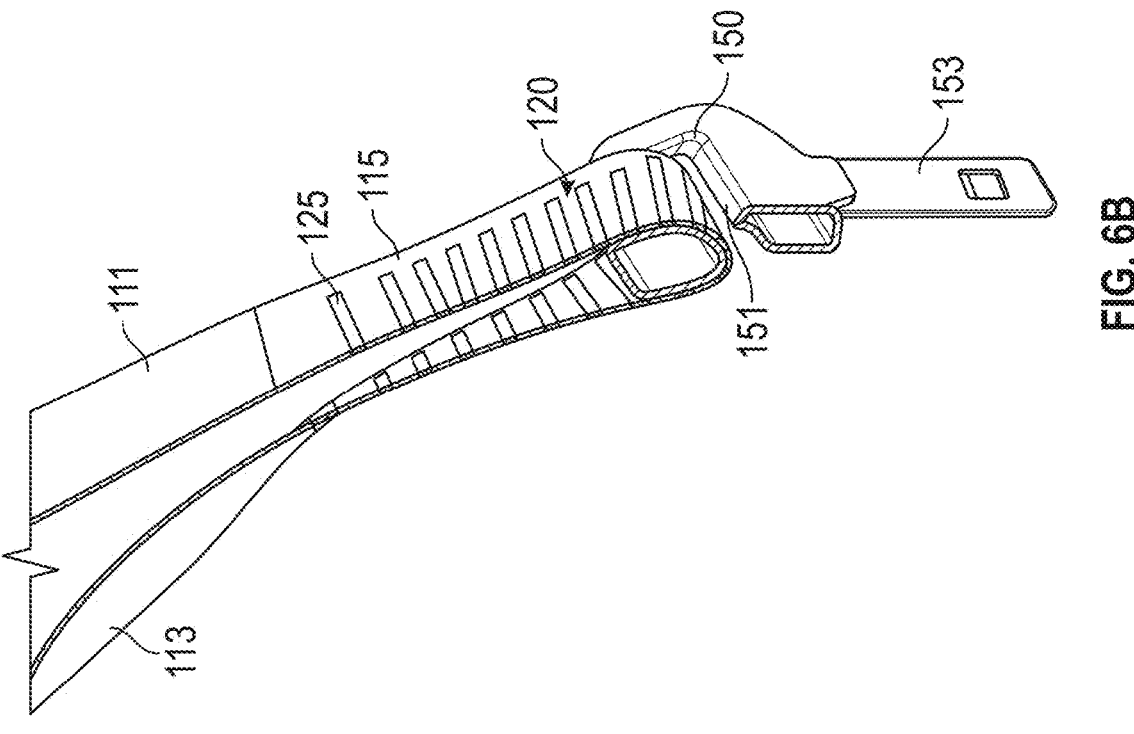
FIG. 6B shows a cross-sectional view of the portion of the seatbelt assembly shown in FIG. 6A.
Figure 6A:
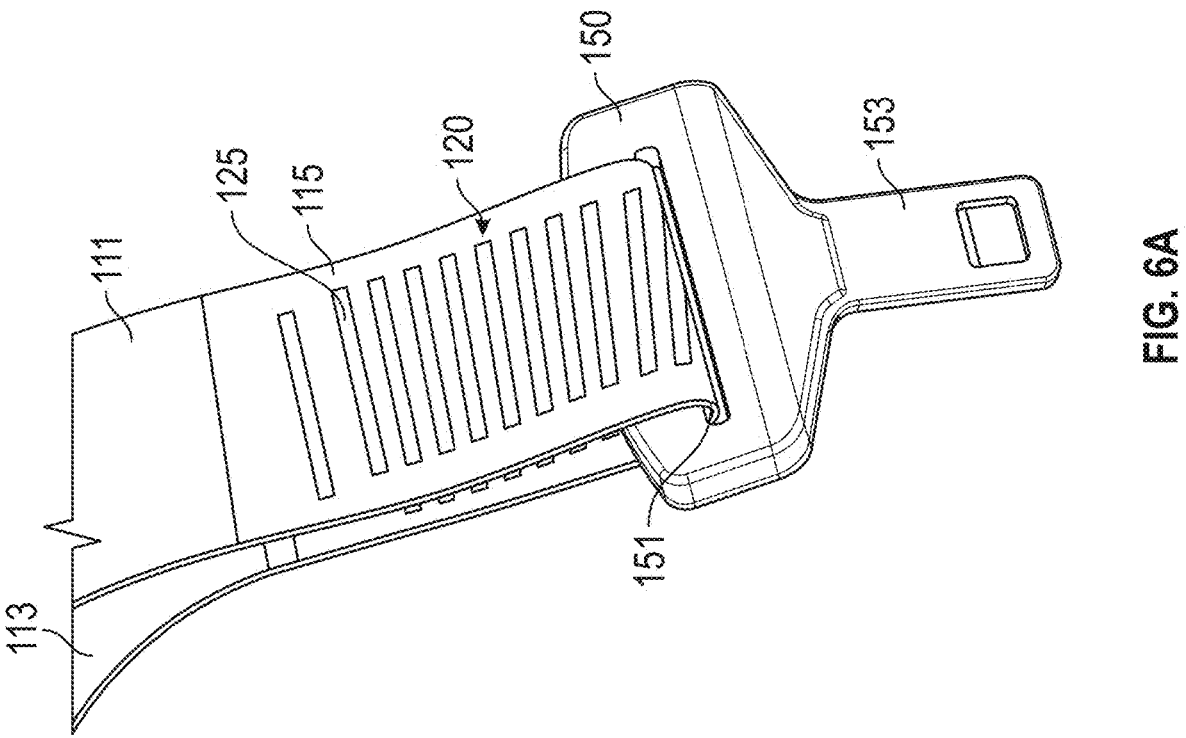
FIG. 6A shows a portion of a seatbelt assembly according to a non-limiting example.

As shown in FIGS. 1, 2, and 3A, the passenger compartment 20 may include a front vehicle seat 41 and/or a rear vehicle seat 42. A seatbelt assembly 100 according to one or more embodiments may be positioned on the front vehicle seat 41 and/or the rear vehicle seat 42. The seatbelt assembly 100 includes a seatbelt 110 which is also commonly referred to as webbing or a strap. The seatbelt assembly 100 may include a pillar loop 180 disposed on an inner side of a B-pillar 43 and/or an inner side of a C-pillar 44, and a retractor 185 disposed within or on the B-pillar 43 and/or the C-pillar 44. One end of the seatbelt 110 may be coupled to the retractor 185. The retractor 185 may pretension the seatbelt 110 and allow the seatbelt 110 to be drawn and retracted in a controlled manner. The seatbelt 110 may extend from the retractor 185 to the pillar loop 180 and loop through the pillar loop 180. The pillar loop 180 and/or the retractor 185 may pull a segment of the seatbelt 110 over a shoulder of an occupant 99 such that the seatbelt 110 is stretched across an upper body of the occupant. The seatbelt assembly 100 may further include a latching structure 150. The latching structure 150 may be a D-ring. The latching structure 150 includes a latch loop 151 through which the seatbelt 110 passes to extend to an anchor positioned on a side of the front vehicle seat 41 and/or the rear vehicle seat 42. As shown in FIGS. 6A and 6B, the latching structure 150 may further include a latch 153 that is inserted into a buckle 190 positioned on a side of the front vehicle seat 41 and/or the rear vehicle seat 42 opposite the anchor.

The seatbelt 110 includes a shoulder belt 111 between the pillar loop 180 and the latching structure 150, and a lap belt 113 extending between the latching structure 150 and the anchor. As the seatbelt 110 is drawn from the retractor 185 and/or retracted into the retractor 185, portions of the seatbelt 110 may move between the shoulder belt 111 and the lap belt 113.

According to one or more embodiments, the seatbelt 110 includes an intermediate belt 115 between the shoulder belt 111 and the lap belt 113. A reinforcement structure 120 is disposed on the intermediate belt 115. The seatbelt 110 defines a longitudinal direction L, a width direction W, and a thickness direction T. The reinforcement structure 120 is configured to resist compression of the intermediate belt 115 along the width direction W.

The reinforcement structure 120 comprises a plurality of reinforcement strips 125. The reinforcement strips 125 may be made of plastic, metal (e.g., steel), or other materials known in the art that have higher stiffness than a material of the seatbelt 110 to provide resistance against compression along the width direction W. The reinforcement strips 125 may be structured as inserts within the seatbelt 110. According to one or more embodiments, the reinforcement strips 125 may be formed of the same material as the seatbelt 110 but may be thicker along the thickness direction T to provide resistance against compression along the width direction W.

Figure 4C:
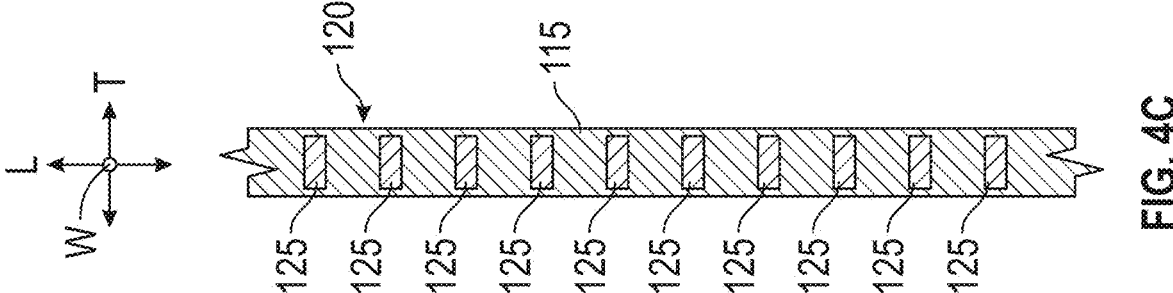
FIG. 4C is a cross-sectional view of an intermediate belt of the seatbelt assembly taken at line IV-IV in FIG. 3B according to a non-limiting example.
Figure 4B:
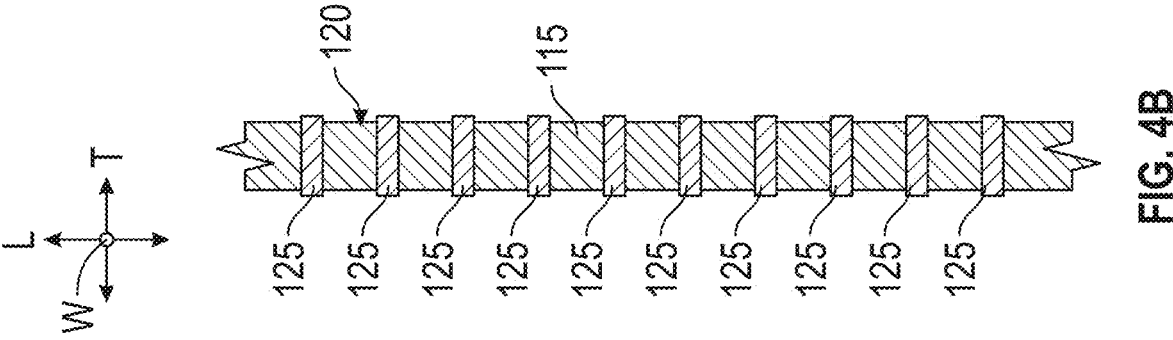
FIG. 4B is a cross-sectional view of an intermediate belt of the seatbelt assembly taken at line IV-IV in FIG. 3B according to a non-limiting example.
Figure 4A:
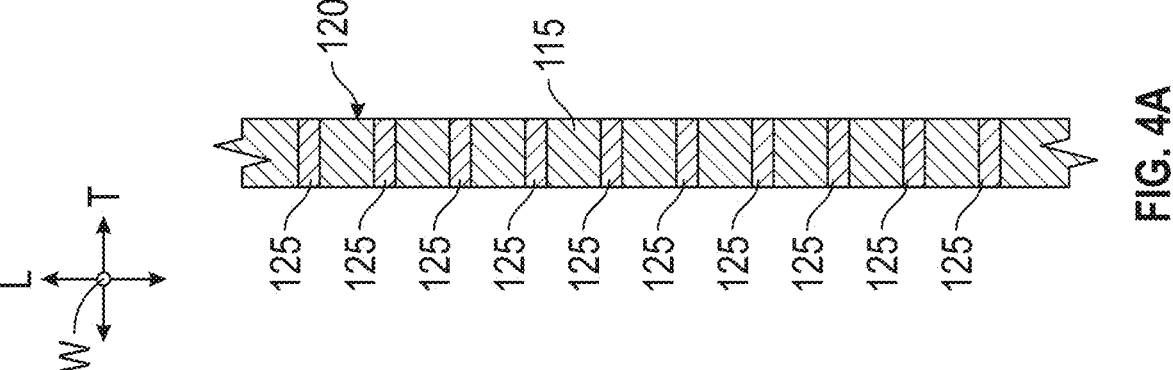
FIG. 4A is a cross-sectional view of an intermediate belt of the seatbelt assembly taken at line IV-IV in FIG. 3B according to a non-limiting example.
Figure 4F:
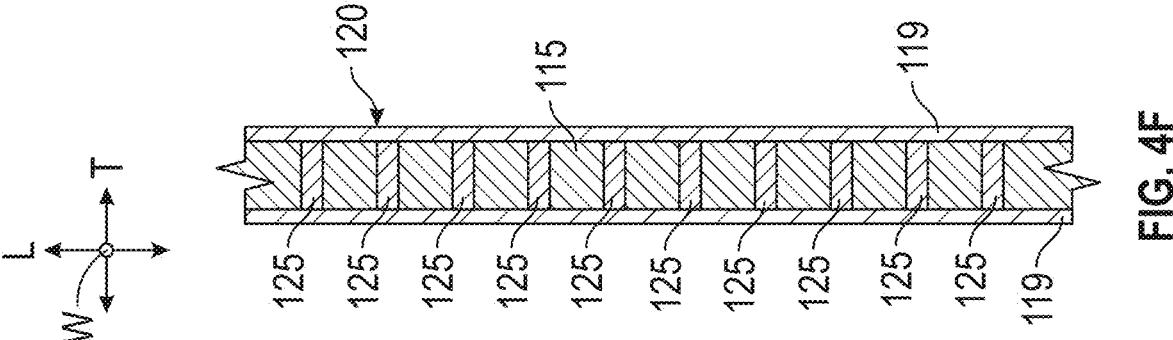
FIG. 4F is a cross-sectional view of an intermediate belt of the seatbelt assembly taken at line IV-IV in FIG. 3B according to a non-limiting example.
Figure 4E:
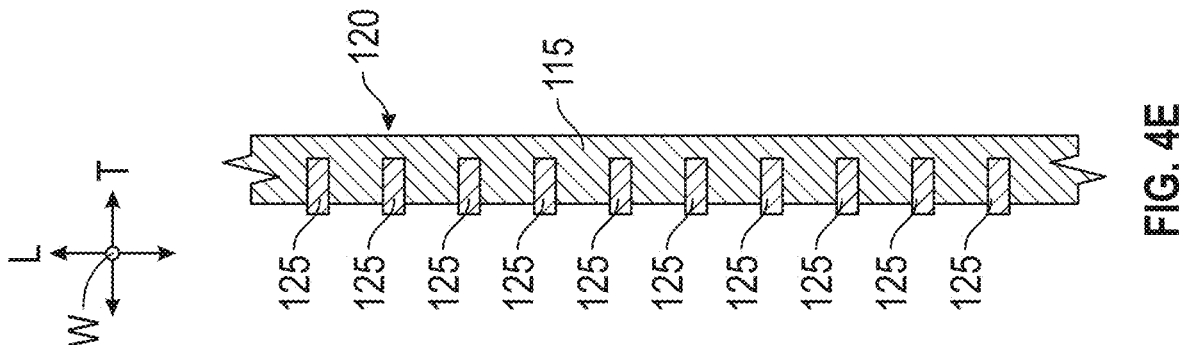
FIG. 4E is a cross-sectional view of an intermediate belt of the seatbelt assembly taken at line IV-IV in FIG. 3B according to a non-limiting example.
Figure 4D:
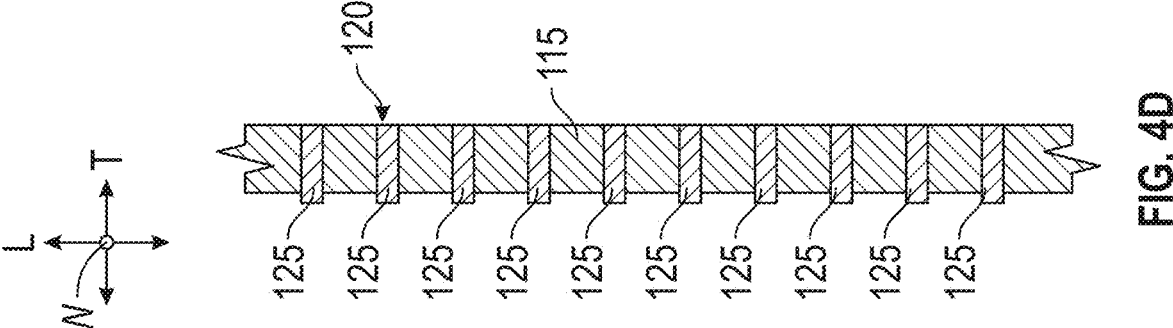
FIG. 4D is a cross-sectional view of an intermediate belt of the seatbelt assembly taken at line IV-IV in FIG. 3B according to a non-limiting example.
Figure 5C:
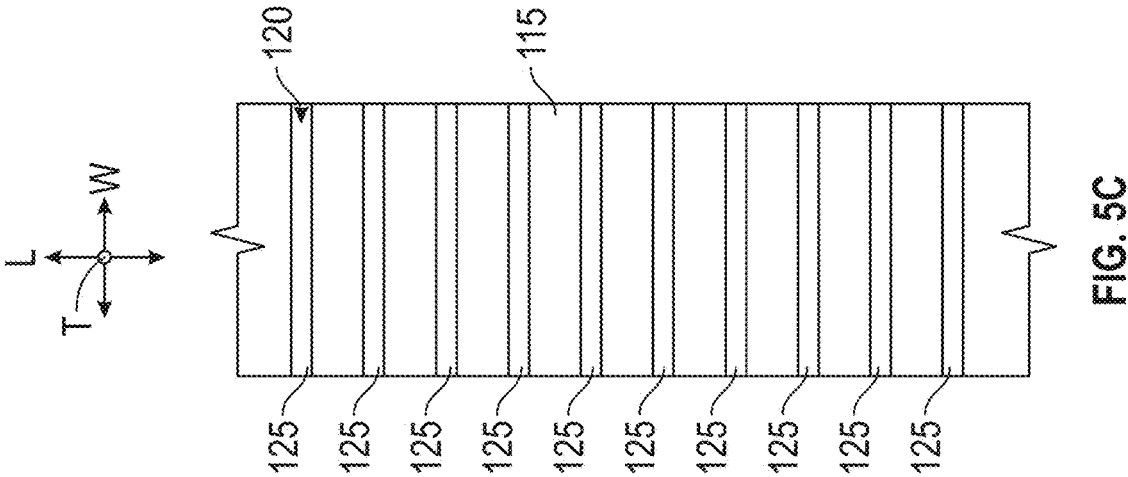
FIG. 5C is a front view of an intermediate belt of the seatbelt assembly according to a non-limiting example.
Figure 5B:
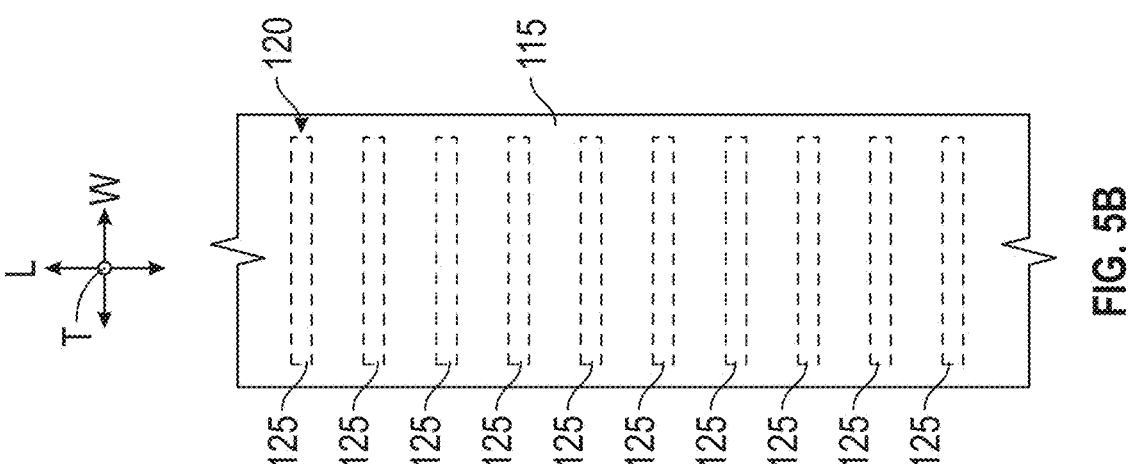
FIG. 5B is a front view of an intermediate belt of the seatbelt assembly according to a non-limiting example.
Figure 5A:
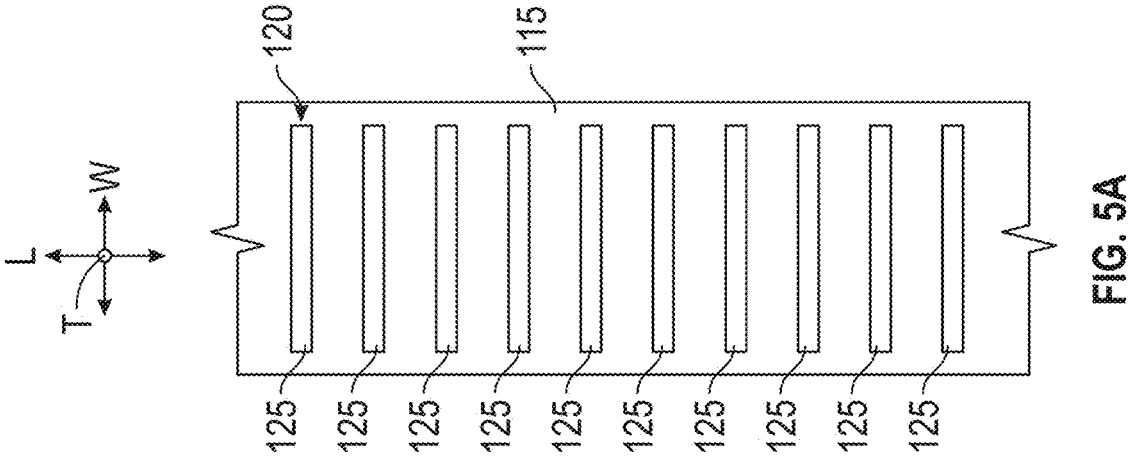
FIG. 5A is a front view of an intermediate belt of the seatbelt assembly according to a non-limiting example.
Figure 5F:
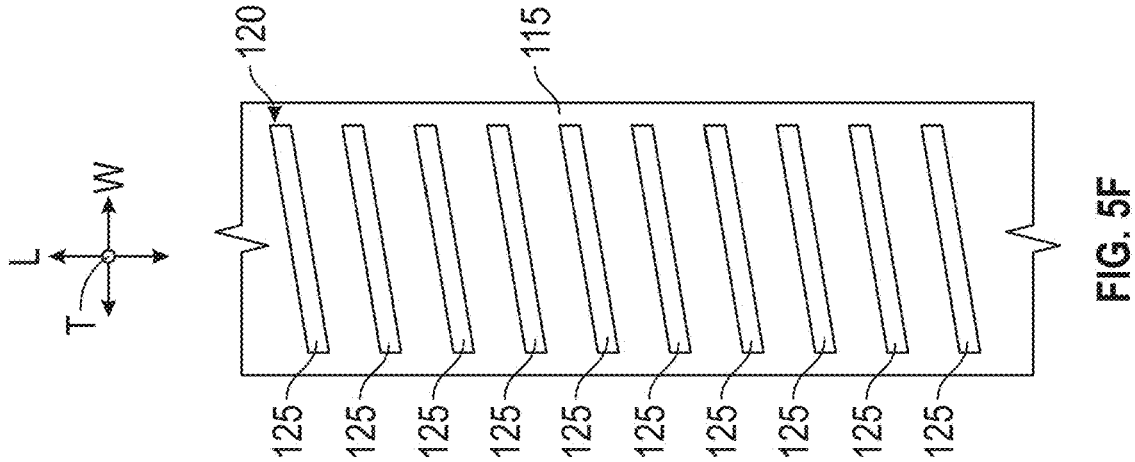
FIG. 5F is a front view of an intermediate belt of the seatbelt assembly according to a non-limiting example.
Figure 5E:
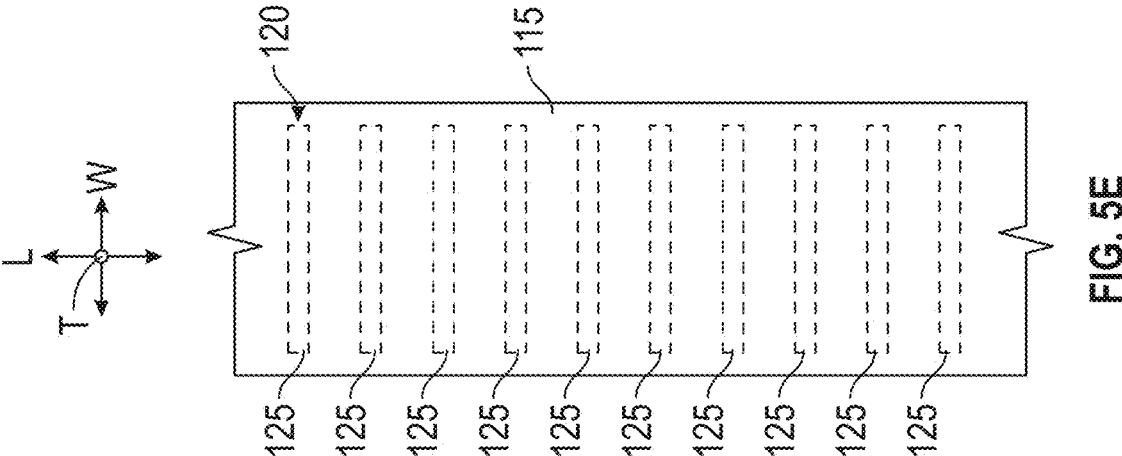
FIG. 5E is a rear view of the intermediate belt of FIG. 5D.
Figure 5D:
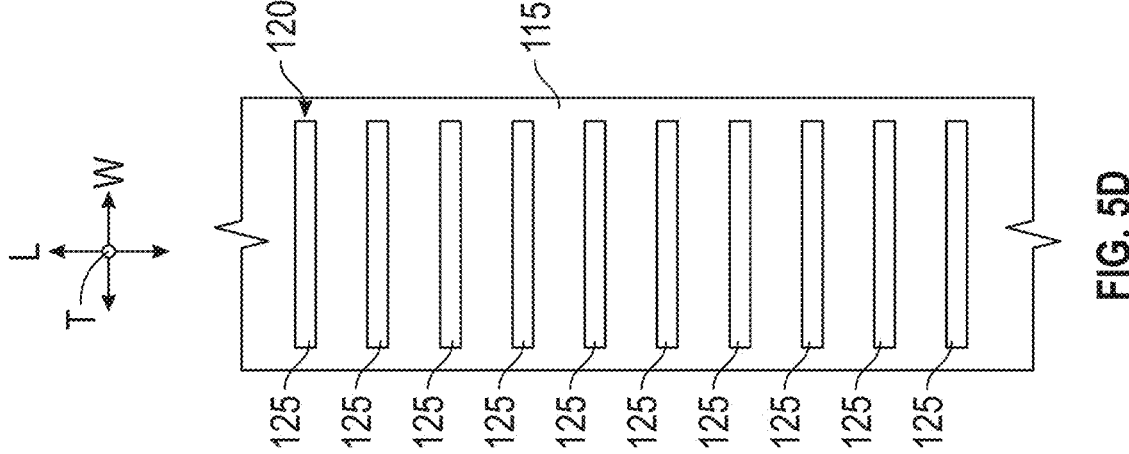
FIG. 5D is a front view of an intermediate belt of the seatbelt assembly according to a non-limiting example.

Referring to FIGS. 4A-4F and 5A-5E, the reinforcement strips 125 extend along the width direction W and are spaced apart from each other along the longitudinal direction L. As shown in FIG. 5F, the reinforcement strips 125 may extend at an acute angle with respect to the width direction W. The reinforcement strips 125 may have a thickness corresponding to a thickness of the seatbelt 110 as shown in FIG. 4A. The reinforcement strips 125 may have a thickness greater than the seatbelt 110 as shown in FIG. 4B. The reinforcement strips 125 may have a thickness less than the seatbelt 110 as shown in FIG. 4C. As shown in FIG. 4D, the reinforcement strips 125 may extend on one side along the thickness direction T beyond a surface of the seatbelt 110 while the reinforcement strips 125 may terminate at a surface of the seatbelt 110 on the other side along the thickness direction T. As shown in FIGS. 4E, 5D, and 5E, the reinforcement strips 125 may extend on one side along the thickness direction T beyond the seatbelt 110 while the reinforcement strips 125 may terminate within the seatbelt 110 on the other side along the thickness direction T. The reinforcement strips 125 may be shorter than the seatbelt 110 along the width direction W as shown in FIG. 5A or may extend between edges of seatbelt 110 along the width direction W as shown in FIG. 5C. The reinforcement strips 125 may be exposed from the seatbelt 110 as shown in FIGS. 5A and 5C or may be embedded within the seatbelt 110 as shown in FIG. 5B. While FIGS. 5A, 5B, 5C, and 5F show front views of the intermediate belt 115, rear views of the intermediate belt 115 may also be similar to the view shown in FIGS. 5A, 5B, and 5C.

As shown in FIGS. 6A and 6B, the intermediate belt 115 is looped through the latch loop 151 of the latching structure 150 with one or more of the reinforcement strips 125 positioned within the latch loop 151 during use. A length of the intermediate belt 115 ensures that the reinforcement strips 125 are positioned within the latch loop 151 when the seatbelt 110 is positioned over occupants 99 of various sizes. The latching structure 150 and the latch loop 151 and the latch 153 thereof are shown in FIGS. 6A and 6B as examples, and the latching structure 150 is not limited thereto.

Figure 7D:
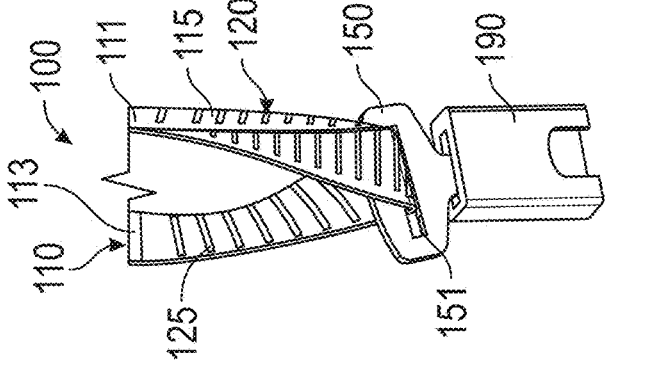
FIGS. 7A, 7B, 7C, and 7D show different stages of a seatbelt assembly according to a non-limiting example during a collision.
Figure 7C:
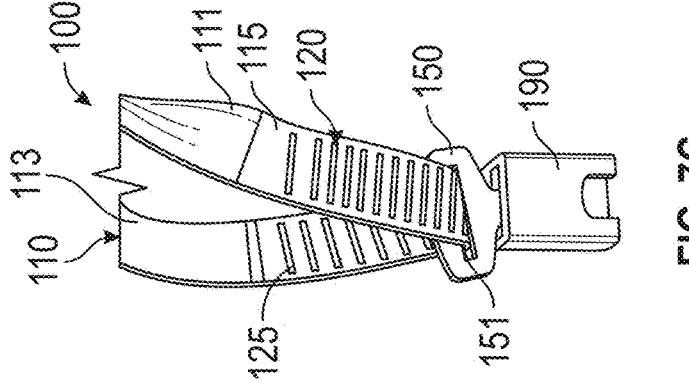
Figure 7B:
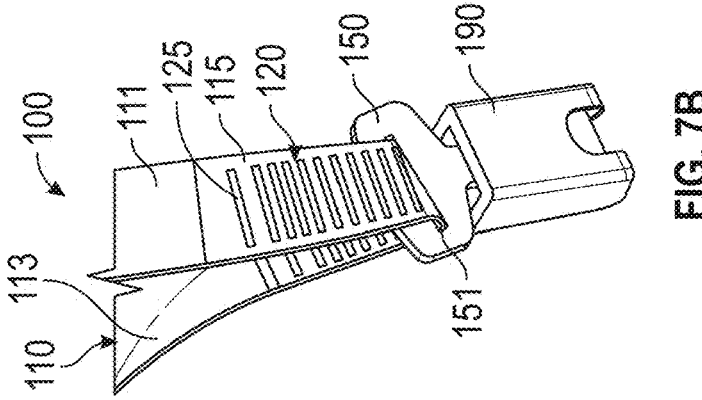
Figure 7A:
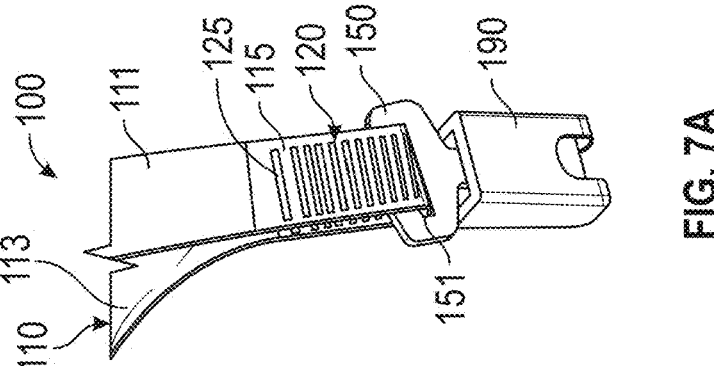

During a collision, a seatbelt may undergo significant loads from an occupant. A conventional seatbelt, due to limited stiffness along the width direction W, may experience bunching at an end of a latch loop. A seatbelt assembly 100 according to one or more embodiments includes the intermediate belt 115 with the reinforcement structure 120 that provides resistance against compression along the width direction W to prevent bunching. FIGS. 7A-7D show a portion of the seatbelt assembly 100 according to one or more embodiments during different stages of a collision. FIG. 7A shows the seatbelt assembly 100 prior to the collision. Prior to the collision, the seatbelt 110 is centered within the latch loop 151. FIG. 7B shows the seatbelt assembly 100 at 28 milliseconds after the collision, at which point the seatbelt 110 moves towards an end of the latch loop 151. FIG. 7C shows the seatbelt assembly 100 at 46 milliseconds after the collision, at which point the seatbelt 110 abuts the end of the latch loop 151 and begins to exert compression forces on the seatbelt 110 along the width direction W. For a conventional seatbelt, these compression forces on the seatbelt may result in bunching of the seatbelt. In contrast, FIG. 7D shows the seatbelt assembly 100 at 80 milliseconds after the collision. The reinforcement strips 125 of reinforcement structure 120 within the latch loop 151 provide sufficient stiffness against the compression forces to prevent bunching of the seatbelt 110.

Figure 8B:
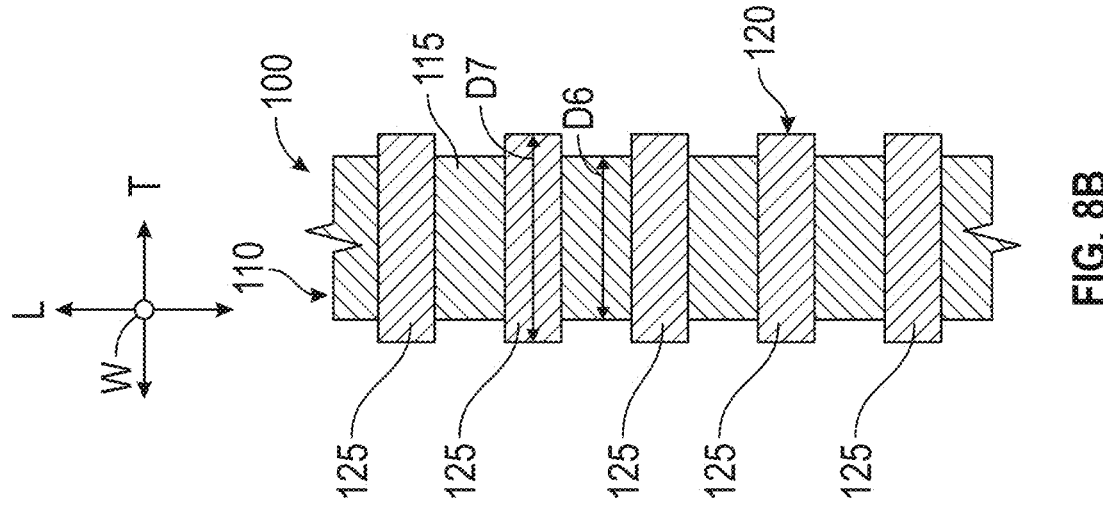
FIG. 8B is a cross-sectional view of an intermediate belt of the seatbelt assembly taken at line 8B-8B in FIG. 8A according to a non-limiting example.
Figure 8A:
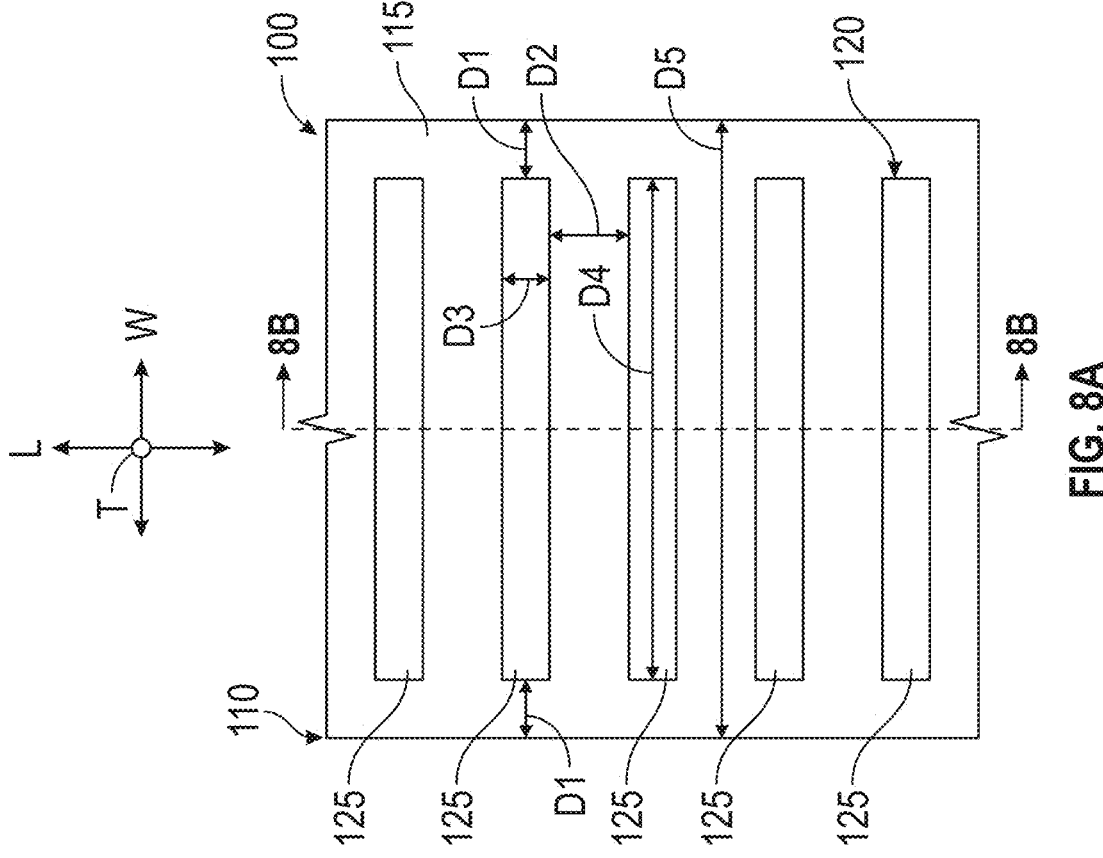
FIG. 8A is a front view of an intermediate belt of the seatbelt assembly according to a non-limiting example.

FIGS. 8A and 8B show a non-limiting example of the intermediate belt 115. Each of the reinforcement strips 125 may be a first distance D1 from edges of the seatbelt 110 along the width direction W. The first distance D1 may be between 1 mm and 5 mm, may be between 2 mm and 4 mm, and may be between 2.5 mm and 3.5 mm. The first distance D1 may be 3 mm. As shown in FIG. 5C, the first distance D1 may be zero.

Adjacent reinforcement strips 125 may be spaced apart along the longitudinal direction L a second distance D2. The second distance D2 may be between 1 mm and 7 mm, between 2 mm and 6 mm, and between 3 mm and 4 mm. As non-limiting examples, the second distance D2 may be 3.6 mm for reinforcement strips 125 formed of steel, and the second distance D2 may be 4.0 mm for reinforcement strips 125 formed of plastic.

The reinforcement strips 125 may have a dimension along the longitudinal direction L of a third distance D3. The third distance D3 may be between 1 mm and 4 mm, and between 2 mm and 3 mm. As non-limiting examples, the third distance D3 may be 1.9 mm for reinforcement strips 125 formed of steel, and the third distance D3 may be 3.0 mm for reinforcement strips 125 formed of plastic.

The reinforcement strips 125 may have a dimension along the width direction W of a fourth distance D4. The fourth distance D4 may be between 30 mm and 50 mm, between 34 mm and 48 mm, between 36 mm and 46 mm, between 40 and 42 mm. The fourth distance D4 may be between 34 and 36 mm. The intermediate belt 115 of the seatbelt 110 may have a dimension along the width direction W of a fifth distance D5 between 45 mm and 50 mm, and between 46 and 48 mm.

The intermediate belt 115 of the seatbelt 110 may have a dimension along the thickness direction T of a sixth distance D6. The sixth distance D6 may be between 1 mm and 3 mm, between 1.2 and 2.2 mm, between 1.2 and 1.5 mm, between 1.5 and 1.9 mm, and between 1.9 and 2.1 mm. The reinforcement strips 125 may have a dimension along the thickness direction T of a seventh distance D7. The seventh distance D7 may be between 1 mm and 4 mm, and between 1.4 mm and 3 mm. As non-limiting examples, the seventh distance D7 may be 1.4 mm for reinforcement strips 125 formed of steel, and the seventh distance D7 may be 3.0 mm for reinforcement strips 125 formed of plastic.

As shown in FIG. 4F, a cover 119 may be disposed over the reinforcement strips 125. For example, a fabric cover 119, which may be formed of a material similar to the seatbelt 110, may be disposed over the reinforcement strips 125 to hide the reinforcement strips 125 from view.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A seatbelt assembly comprising:
a seatbelt defining a longitudinal direction, a width direction, and a thickness direction, and comprising a shoulder belt, a lap belt, and an intermediate belt disposed between the shoulder belt and the lap belt; and
a reinforcement structure disposed on the intermediate belt,
wherein the reinforcement structure comprises a plurality of reinforcement strips extending along the width direction and spaced apart from each other along the longitudinal direction,
wherein the plurality of reinforcement strips are positioned on the intermediate belt, and no reinforcement strip is positioned on the shoulder belt or the lap belt, and
wherein the plurality of reinforcement strips are entirely covered so as to not be exposed.

2. The seatbelt assembly of claim 1, wherein the reinforcement structure provides additional stiffness to the intermediate belt such that the intermediate belt has greater stiffness along the width direction than the shoulder belt and the lap belt.

3. The seatbelt assembly of claim 1, wherein the reinforcement strips are formed of metal.

4. The seatbelt assembly of claim 1, wherein the reinforcement strips are formed of steel.

5. The seatbelt assembly of claim 1, wherein the reinforcement strips are formed of plastic.

6. The seatbelt assembly of claim 1, wherein gaps are formed between the reinforcement strips and edges of the seatbelt along the width direction.

7. The seatbelt assembly of claim 1, wherein the intermediate belt is thicker along the thickness direction than the reinforcement strips.

8. The seatbelt assembly of claim 1, wherein the reinforcement strips are embedded within the intermediate belt.

9. The seatbelt assembly of claim 1, wherein a fabric cover covers at least one side of the plurality of reinforcement strips.

10. The seatbelt assembly of claim 1, wherein each of the reinforcement strips has a dimension along the longitudinal direction that is less than a distance between adjacent reinforcement strips of the plurality of reinforcement strips.

11. A vehicle comprising:
a vehicle seat; and a seatbelt assembly mounted on or adjacent to the vehicle seat,
wherein the seatbelt assembly comprises:
a latching structure defining a latch loop therein;
a seatbelt defining a longitudinal direction, a width direction, and a thickness direction, and comprising a shoulder belt, a lap belt, and an intermediate belt disposed between the shoulder belt and the lap belt and passing through the latch loop; and
a reinforcement structure disposed on the intermediate belt,
wherein the reinforcement structure comprises a plurality of reinforcement strips extending along the width direction and spaced apart from each other along the longitudinal direction,
wherein the plurality of reinforcement strips are positioned on the intermediate belt, and no reinforcement strip is positioned on the shoulder belt or the lap belt, and
wherein the plurality of reinforcement strips are entirely covered so as to not be exposed.

12. The vehicle of claim 11, wherein the intermediate belt has a first dimension along the longitudinal direction, and adjacent reinforcement strips of the reinforcement strips are spaced apart by a second dimension, the first and second dimensions being set such that at least one of the reinforcement strips is always within the latch loop during use.

13. The vehicle of claim 11, wherein gaps are formed between the reinforcement strips and edges of the seatbelt along the width direction.

14. The vehicle of claim 11, wherein the intermediate belt is thicker along the thickness direction than the reinforcement strips.

15. The vehicle of claim 11, wherein the reinforcement strips are embedded within the intermediate belt.

16. The vehicle of claim 11, wherein a fabric cover covers at least one side of the plurality of reinforcement strips.

17. The vehicle of claim 11, wherein each of the reinforcement strips has a dimension along the longitudinal direction that is less than a distance between adjacent reinforcement strips of the plurality of reinforcement strips.

18. A vehicle comprising:
a vehicle seat; and
a seatbelt assembly mounted on or adjacent to the vehicle seat,
wherein the seatbelt assembly comprises:
a latching structure defining a latch loop therein;
a seatbelt defining a longitudinal direction, a width direction, and a thickness direction, and comprising a shoulder belt, a lap belt, and an intermediate belt disposed between the shoulder belt and the lap belt and passing through the latch loop; and
a reinforcement structure disposed on the intermediate belt,
wherein the reinforcement structure provides additional stiffness to the intermediate belt such that the intermediate belt has greater stiffness along the width direction than the shoulder belt and the lap belt,
wherein the reinforcement structure comprises a plurality of reinforcement strips extending along the width direction and spaced apart from each other along the longitudinal direction,
wherein the reinforcement strips are formed of metal or plastic, wherein the plurality of reinforcement strips are positioned on the intermediate belt, and no reinforcement strip is positioned on the shoulder belt or the lap belt, and wherein the plurality of reinforcement strips are entirely covered so as to not be exposed.

\* \* \* \* \*